(12) United States Patent
Merchant

(10) Patent No.: US 6,360,473 B1
(45) Date of Patent: Mar. 26, 2002

(54) ADJUSTABLE APERTURE MECHANISM

(76) Inventor: William H. Merchant, 2177 Bagdad Rd., Bagdad, KY (US) 40003

( * ) Notice: Subject to any disclaimer, the term of this patent is extended or adjusted under 35 U.S.C. 154(b) by 0 days.

(21) Appl. No.: 09/477,056

(22) Filed: Jan. 4, 2000

Related U.S. Application Data

(60) Provisional application No. 60/115,568, filed on Jan. 12, 1999, now abandoned.

(51) Int. Cl.⁷ .................................................. F41G 1/42
(52) U.S. Cl. ........................................... 42/133; 42/143
(58) Field of Search ..................... 33/251, 246; 42/100, 42/133, 143

(56) References Cited

U.S. PATENT DOCUMENTS

| | | |
|---|---|---|
| 807,712 A | 12/1905 | Bassell et al. |
| 2,061,017 A | 11/1936 | Arden |
| 2,457,648 A | 12/1948 | Donner |
| 3,265,412 A | 8/1966 | Reid et al. |
| 3,456,351 A * | 7/1969 | Gehmann ..................... 33/251 |
| 4,366,625 A * | 1/1983 | Gehmann ..................... 33/251 |
| 4,833,786 A | 5/1989 | Shores, Sr. |
| 4,865,363 A | 9/1989 | Takahashi |
| 5,600,094 A | 2/1997 | McCabe |

FOREIGN PATENT DOCUMENTS

SE        144373        3/1954

* cited by examiner

*Primary Examiner*—Stephen M. Johnson
(74) *Attorney, Agent, or Firm*—Theresa Fritz Camoriano; Camoriano and Associates

(57) ABSTRACT

An adjustable aperture forming mechanism provides a tapered hole, an O-ring located in the tapered hole, and a pusher that pushes the O-ring and compresses it into the tapered hole in order to reduce the size of the aperture. When the pusher is retracted, the O-ring returns to its uncompressed, enlarged shape, enlarging the shape of the aperture.

11 Claims, 2 Drawing Sheets

OPEN POSITION

OPEN POSITION

CLOSED POSITION

ADJUSTABLE APERTURE MECHANISM

This application claims priority from Provisional Application Ser. No. 60/115,568 filed Jan. 12, 1999 now abandoned.

BACKGROUND OF THE INVENTION

The present invention relates to a mechanism for adjusting the size of an aperture. This adjustable aperture mechanism may be used to control the flow of light, gas, or fluid, or it may be used as a collet or chuck to hold a solid object in place.

In target shooting, an adjustable aperture is desirable, because it allows the shooter the ability to fine tune his or her sight picture for optimum performance. Until now, the only way to change aperture diameters for an AR-15/M-16 service rifle was to use a system consisting of interchangeable fixed diameter inserts. This system is slow and tedious to use, prone to inadequate adjustment, and is prone to the loss of individual parts.

SUMMARY OF THE INVENTION

The present invention provides a tapered hole, an O-ring located in the tapered hole, and a pusher that pushes the O-ring into the tapered hole, to reduce the size of the aperture. When the pusher is retracted, the O-ring returns to its enlarged shape, enlarging the size of the aperture. This mechanism permits periodic or continuously-variable control of the size of the aperture by adjusting the position of the pusher.

DESCRIPTION OF THE PREFERRED EMBODIMENT

Figure 1:
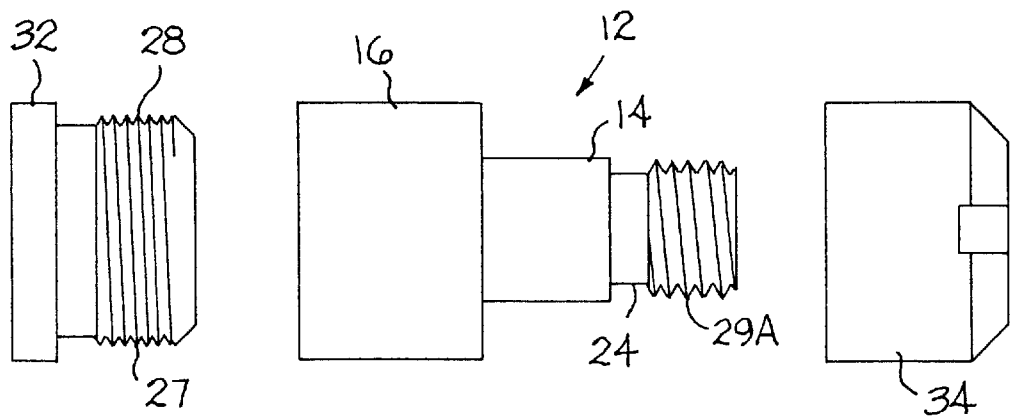
FIG. 1 is an exploded side view of an adjustable aperture made in accordance with the present invention.
Figure 2:
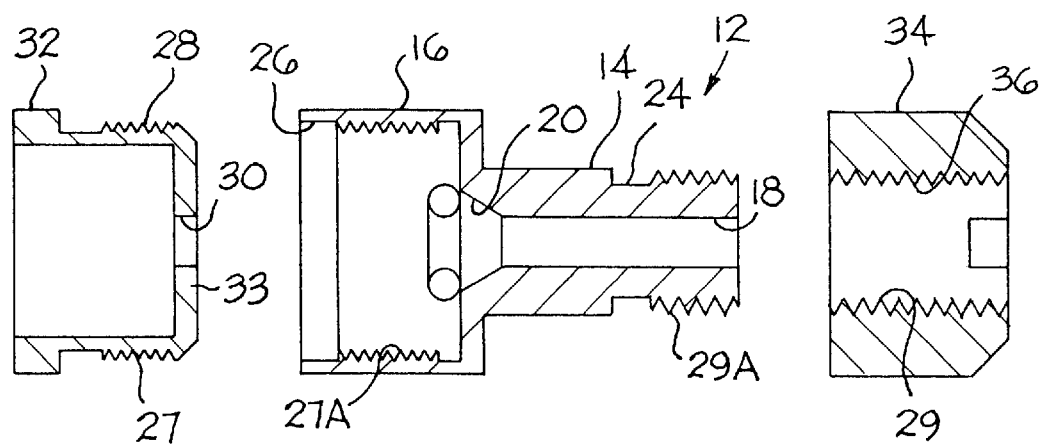
FIG. 2 is an exploded side sectional view of the adjustable aperture of FIG. 1.

The preferred embodiment of the adjustable aperture mechanism shown in FIGS. 1–4 is configured for use as an adjustable aperture for the rear sight of a target rifle. The adjustable aperture mechanism 10 includes an aperture body 12, which is substantially cylindrical in shape. The aperture body 12 has a small diameter portion 14 and a large diameter portion 16. The aperture body 12 defines an axial aperture 18, extending throughout the length of the body 12. The axial aperture 18 is enlarged in the large diameter portion 16, and the aperture 18 defines a tapered portion 20, having a frustro-conical shape, at the intersection of the large diameter portion 16 and the small diameter portion 14. An O-ring 22 lies at the large-diameter end of the tapered aperture 18. It may be desirable to apply a light film of light machine oil to the interface between the O-ring 22 and the tapered aperture to ensure that the O-ring will slide smoothly along the aperture without binding. There are threads 29A on the outer surface of the small diameter portion 14 and threads 27A on the inner surface of the large diameter portion 16. There is a reduced-diameter step 24 in the outer surface of the small diameter portion 14, and there is an enlarged-diameter step 26 in the inner surface of the large diameter portion 16.

The adjustable aperture mechanism 10 also includes an eye piece 28, which is substantially cylindrical in shape and defines an axial aperture 30 extending throughout its entire length. There are threads 27 on the outer surface of the eyepiece 28, which mate with the internal threads 27A on the enlarged diameter portion 16 of the aperture body 12. As the eyepiece 28 is threaded into the aperture body 12, it serves as a pusher. The eyepiece 28 includes a flange 32 at its back end and a flat surface 33 at its forward end. The adjustable aperture mechanism 10 also includes a retainer 34, which is substantially cylindrical in shape and defines an axial aperture 36. The retainer 34 has internal threads 29 which mate with the external threads 29A on the reduced diameter portion 14 of the aperture body 12. The retainer 34 is used to hold the adjustable aperture mechanism on a rifle.

Figure 3:
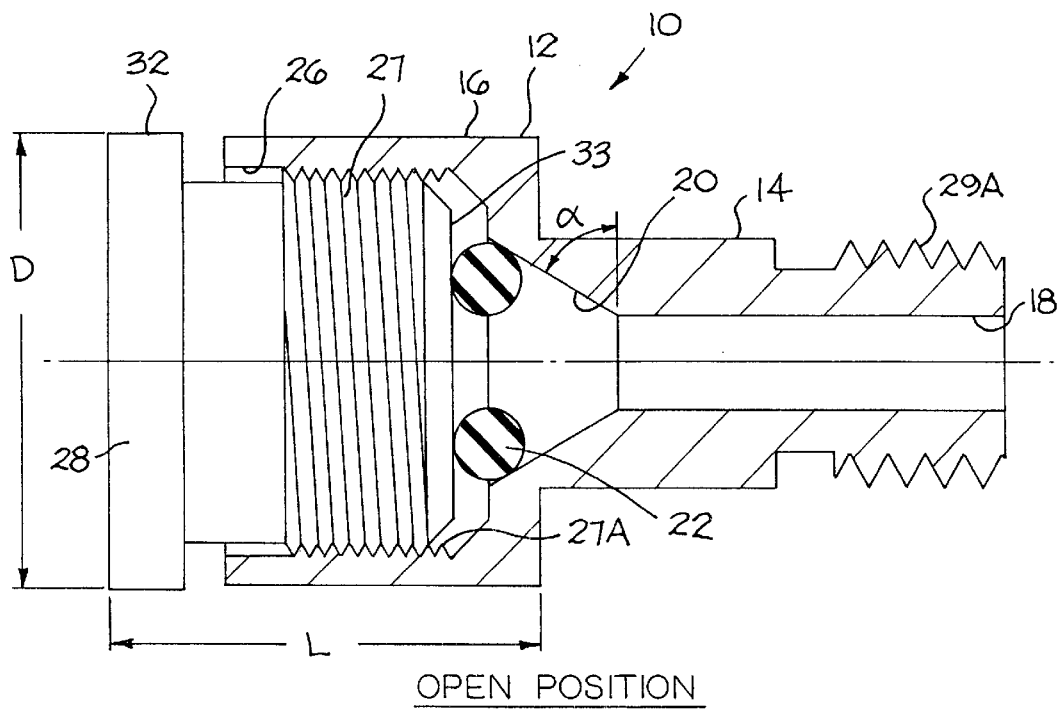
FIG. 3 is a side sectional view of the assembled adjustable aperture of FIG. 1 in the open position.
Figure 4:
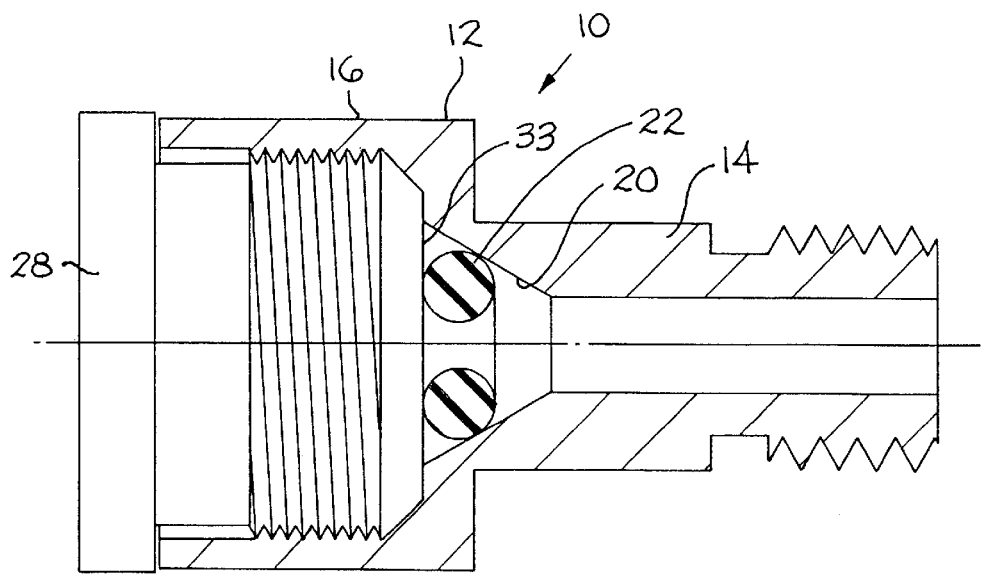
FIG. 4 is the same view as FIG. 3 but in the reduced aperture position.

As shown in FIG. 3, when the aperture is in the "open" position, the O-ring 22 is lying at the outer edge of the tapered surface 20. The eyepiece 28 is threaded into the aperture body 12 just far enough to contact the O-ring 22. At this point, the inside diameter of the O-ring 22 is approximately equal to the smallest diameter of the aperture 18 of the aperture body 12, so the O-ring 22 is not reducing the size of the aperture. In order to reduce the diameter of the aperture, the eyepiece 28 is threaded further into the aperture body 12, pushing the O-ring 22 down into the tapered hole 20. This squeezes the O-ring uniformly around its circumference, thereby reducing the inside diameter of the O-ring and restricting the opening through which light can pass. As the eye piece 28 is threaded further into the aperture body 12, the O-ring is pushed further into the tapered hole 20, which reduces the inside diameter of the O-ring 22 still further, until the flat end surface 33 of the eye piece 28 abuts the aperture body 12, as shown in FIG. 4, at which point the O-ring inside diameter is reduced as far as it will go in this mechanism. Depending upon the sizes of the O-ring and the tapered hole, the aperture may be completely closed at this point or it may be at some desired small diameter.

To increase the size of the aperture, the process is reversed, and the resilient O-ring automatically expands and moves toward the larger diameter opening as the pressure of the eye piece 28 is released.

When this adjustable aperture mechanism is used on a rifle, the assembled mechanism forms a hood, which cancels out any shadows caused by the sun shining directly on the rear sight of the rifle. There are rules of competition which limit the dimensions of the hood. The length "L" (see FIG. 3) can be no greater than 0.650 inches, and the diameter "D" can be no greater than 0.375 inches. In this preferred embodiment, the length is 0.350 inches, plus or minus 0.010 inches, and the diameter is 0.350 inches, plus or minus 0.010 inches. The O-ring diameter in this preferred embodiment is $3/16$-inch outside diameter and $1/16$-inch inside diameter, with a wall thickness of $1/16$-inch when at rest. In this preferred embodiment, the O-ring 22 is made of standard Buna-N neoprene rubber. The tapered hole 20 tapers at an angle $\alpha$ (See FIG. 3) of 60°, which means that the angle between the tapered surface 20 and the straight cylindrical surface of the aperture 18 is 210°. This produces an aperture that varies in size from approximately 0.015 inches to 0.0625 inches in diameter. The movement of the pusher into and out of the aperture body is completely reversible, with no permanent deformation of the pusher, the O-ring, or the aperture body.

While the foregoing description describes the adjustable aperture mechanism being used for the sight for a particular rifle, with certain specific dimensions, it is clear that the dimensions may vary depending upon the application. For example, the adjustable aperture mechanism could be used as a valve for intravenous fluid; it could be used to focus beams of light for other purposes, and it could be used as a collet or chuck to hold a small-diameter solid member in place. It will be obvious to those skilled in the art that other modifications may be made to the embodiment described above without departing from the scope of the present invention.

What is claimed is:

1. An adjustable aperture forming mechanism for controlling flow of medium therethrough, comprising;
    an aperture body having a front end and a back end and defining a through-hole having an axis extending from said front end to said back end, said through-hole having an internal tapered portion;
    a continuous elastic ring which lies in said through-hole adjacent to said internal tapered portion; and
    a pusher movably mounted on said aperture body, such that, when said pusher moves in a first direction along said axis, it exerts pressure on said elastic ring, forcing said ring to move linearly along said axis into said tapered portion to effectively reduce the inside diameter of said elastic ring, thus decreasing the effective diameter of the through-hole, and, when said pusher moves in the opposite direction, it releases pressure on said elastic ring, permitting the ring to return to a larger diameter portion of said tapered portion, where the elastic ring returns to a larger inside diameter, thereby enlarging the effective diameter of the through-hole.

2. An adjustable aperture forming mechanism as recited in claim 1, wherein said elastic ring is an O-ring.

3. An adjustable aperture forming mechanism as recited in claim 1, wherein said pusher is threaded onto said aperture body.

4. An adjustable aperture forming mechanism as recited in claim 1, wherein said pusher defines a second through-hole aligned with the through-hole in said aperture body, such that said pusher serves as an eyepiece and as a hood.

5. An adjustable aperture forming mechanism as recited in claim 4, wherein said pusher is threaded onto said aperture body, and further comprising a retainer threaded onto the front end of said aperture body.

6. An adjustable aperture forming mechanism as recited in claim 1, wherein the action of said pusher on said elastic ring is completely reversible with no permanent deformation of said pusher, said elastic ring, or said aperture body.

7. An adjustable aperture forming mechanism for controlling flow of medium therethrough as recited in claim 1, wherein said internal tapered portion has a substantially frustro-conical shape.

8. An adjustable aperture forming mechanism for controlling the flow of medium therethrough, comprising:
    an aperture body having a front end and a back end and defining a through-hole extending from said front end to said back end, said through-hole having an internal tapered portion;
    an elastic ring which lies in said through-hole adjacent to said internal tapered portion; and
    a pusher movably mounted on said aperture body, such that, when said pusher moves in a first direction it exerts pressure on said elastic ring, forcing said ring into said tapered portion to effectively reduce the inside diameter of said elastic ring, thus decreasing the effective diameter of the through-hole, and, when said pusher moves in the opposite direction, it releases pressure on said elastic ring, permitting the ring to return to a larger diameter portion of said tapered portion, where the elastic ring returns to a larger inside diameter, thereby enlarging the effective diameter of the through-hole; and
    wherein said pusher defines a second through-hole aligned with the through-hole in said aperture body, such that said pusher serves as an eyepiece and a hood,
    wherein said eyepiece has an outside diameter no greater than 0.375 inches, and said eyepiece has a length which is no greater than 0.650 inches.

9. An adjustable aperture forming mechanism for controlling the flow of medium therethrough, comprising:
    an aperture body having a front end and a back end and defining a through-hole extending from said front end to said back end, said through-hole having an internal tapered portion;
    an elastic ring which lies in said through-hole adjacent to said internal tapered portion; and
    a pusher movably mounted on said aperture body, such that, when said pusher moves in a first direction it exerts pressure on said elastic ring, forcing said ring into said tapered portion to effectively reduce the inside diameter of said elastic ring, thus decreasing the effective diameter of the through-hole, and, when said pusher moves in the opposite direction, it releases pressure on said elastic ring, permitting the ring to return to a larger diameter portion of said tapered portion, where the elastic ring returns to a larger inside diameter, thereby enlarging the effective diameter of the through-hole; wherein the angle between the tapered portion of said through hole and an adjacent straight cylindrical portion of said through hole is approximately 210 degrees.

10. An adjustable aperture forming mechanism, comprising:
    an aperture body, having a forward end and a back end and defining a first through-hole having an axis extending from said forward end to said back end, said aperture body being substantially cylindrically-shaped, defining a reduced diameter forward portion and an enlarged diameter rear portion, wherein said through-hole defines a tapered portion lying between said reduced diameter forward portion and said enlarged diameter rear portion;
    a flexible ring in said through-hole adjacent the tapered portion of the through-hole;
    a pusher threaded into the enlarged diameter portion of said aperture body, said pusher defining a second through-hole aligned with the first through-hole, such that rotating the pusher in one direction causes it to push the flexible ring linearly, along the axis, into the tapered portion, thereby reducing the diameter of the O-ring, and rotating the pusher in the opposite direction releases pressure on the flexible ring, permitting the flexible ring to move back toward a relaxed position, in which the O-ring has a larger inside diameter.

11. An adjustable aperture forming mechanism as recited in claim 10, wherein said tapered portion has a substantially frustro-conical shape.

* * * * *